United States Patent

Ingram et al.

[15] 3,703,319
[45] Nov. 21, 1972

[54] HYDRAULIC SYSTEMS FOR VEHICLES

[72] Inventors: Brian Ingram, Balsall Common; David Anthony Harries, Solihull; Lancelot Phoenix, Birmingham, all of England

[73] Assignee: Girling Limited, Birmingham, England

[22] Filed: Sept. 17, 1970

[21] Appl. No.: 73,081

[30] Foreign Application Priority Data

Sept. 17, 1969 Great Britain..........45,705/69

[52] U.S. Cl..............................................303/21 F
[51] Int. Cl...............................................B60t 8/06
[58] Field of Search...............303/21 R, 21 F, 21 BE; 188/181 A

[56] References Cited

UNITED STATES PATENTS 3,556,609  1/1971  MacDuff................188/181 A
3,556,608  1/1971  MacDuff..................303/21 F
3,482,887  12/1969  Sheppard...............303/21 BE
3,576,350  4/1971  Larsen.....................303/21 F Primary Examiner—Richard E. Aegerter
Attorney—Imirie and Smiley

[57] ABSTRACT

In a vehicle hydraulic braking system fluid under pressure from a master cylinder is supplied to a wheel brake through a chamber of which the effective volume is variable between a minimum value and a maximum value by movement of a piston assembly working in a bore in communication with the chamber.

Means are included for normally subjecting the piston assembly to a supply of pressure fluid to urge the piston assembly into a first position in which the effective volume of the chamber is at the minimum value. A control valve is operative in response to a control signal to cause movement of the piston assembly in a second opposite direction to increase the effective volume of the chamber whereby the pressure of hydraulic fluid applied to the wheel brake is reduced.

20 Claims, 6 Drawing Figures

INVENTORS
BRIAN INGRAM
DAVID A. HARRIES
LANCELOT PHOENIX

INVENTORS
BRIAN INGRAM
DAVID A. HARRIES
LANCELOT PHOENIX

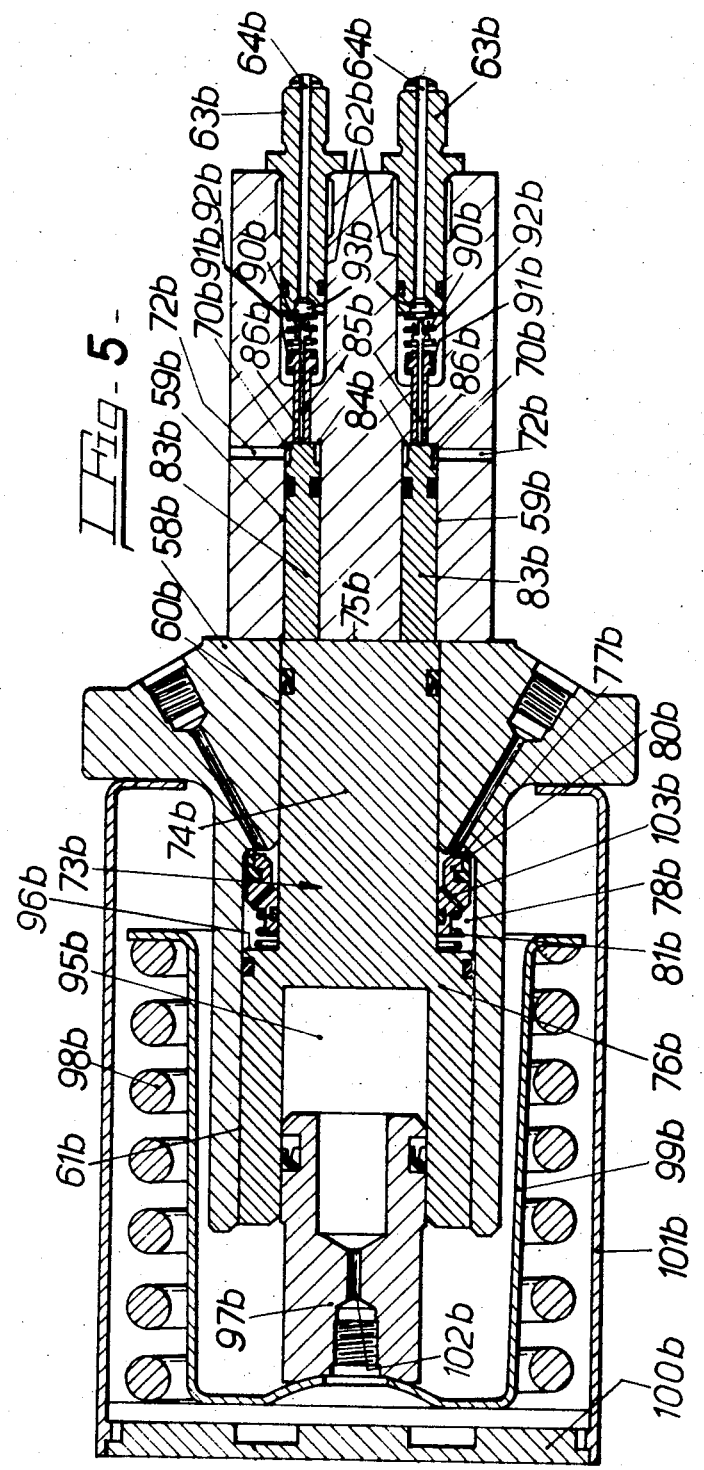

HYDRAULIC SYSTEMS FOR VEHICLES

SPECIFIC DESCRIPTION

This invention relates to a new or improved hydraulic braking system for a vehicle of the kind in which the supply of hydraulic fluid under pressure to a wheel brake is controlled by a pedal-operated master cylinder, and anti-skid sensing means are incorporated for regulating the braking effort applied to the braked wheel when the deceleration of that wheel exceeds a predetermined value.

According to our invention in an hydraulic braking system of the kind set forth for vehicles hydraulic fluid under pressure under the control of the master cylinder is supplied to the wheel brake through a chamber of which the effective volume is adapted to be varied between a minimum value and a maximum value by movement of a piston assembly working in a cylinder bore in communication with the chamber, and means are included for normally subjecting the piston assembly to a supply of pressure fluid to urge the piston assembly into a first position in which the effective volume of the chamber is at a minimum value, a control valve being operative in response to a control signal to cause movement of the piston assembly in a second opposite direction to increase the effective volume of the chamber whereby the pressure of hydraulic fluid applied to the wheel brake is reduced.

Conveniently the piston assembly is normally urged into the first position by an actuator including a movable wall which acts on the piston assembly and, when the deceleration of the braked wheel exceeds a predetermined value, the movable wall is subjected to a supply of fluid under pressure which is operative to move the movable wall in an opposite direction and allow the piston assembly to move in the said second direction.

The movable wall may comprises a piston working in an hydraulic cylinder and subjected over different areas to hydraulic fluid pressure controlled by the control valve which is responsive to deceleration of the braked wheel.

Alternatively the movable wall may comprise a diaphragm assembly incorporated in a fluid pressure operated booster and adapted to be subjected on opposite sides to differential fluid pressures which are adapted to be controlled by the control valve which is adapted to be actuated when the deceleration of the braked wheel exceeds the predetermined value.

The differential fluid pressures may be that between atmosphere and a source of vacuum, such as the induction manifold of an engine of the vehicle, or between a source of compressed air and atmosphere.

In either construction a spring may act on the movable wall to urge the piston assembly in the first direction in which the effective volume of the chamber is of the minimum value, Thus, movement of the piston assembly in the second direction is in opposition to the force in the spring which after the deceleration of the brake wheel is restored to the predetermined value is effective to move the piston assembly in the first direction to pressurize the volume of fluid in the chamber and effect re-application of the wheel brake.

Cut-off and supply of high pressure fluid from the master cylinder to the wheel brake is controlled by valve means under the control of the piston assembly and, preferably, the valve means comprises a two stage valve so that cut-off and re-application of the brake takes place gradually.

The deceleration sensing means comprises an electrically inductive sensor fitted to the wheel with its A.C. output signal fed into an electronic control module which converts the A.C. signal into a D.C. output and operation of the control valve means is controlled by a solenoid which is energized by the D.C. out put from the control module.

Normally each wheel of the vehicle will be provided with an electrically inductive sensor as aforesaid and the A.C. output signal from each sensor will be fed into a separate electronic control module for each wheel of which the D.C. output is adapted to energize a solenoid operated valve controlling delivery to and exhaust from the movable piston assembly which regulates the effective volume of the chamber.

In a modification the A.C. output signals from a pair of wheel sensors, for example the sensors of the rear wheels of the vehicle, may be fed into a common electronic control module which differentiates the signals and feeds a D.C. output to the solenoid operated valve controlling the braking to the pair of rear wheels.

The piston assembly may be of stepped form working in the cylinder bore which is of complementary stepped outline, and comprises an expander piston of smaller diameter for regulating the effective volume of the chamber and an actuator piston of greater diameter upon which acts high pressure fluid from a high pressure source to move the assembly in the bore.

Alternatively, in a modified construction, two expander pistons in parallel relationship may be operated by a single actuator piston of large diameter and the expander pistons may be of equal or different diameters.

The actuator piston at the end remote from the expander piston or pistons may be provided with a bore in which works a third piston through which the spring acts on the piston assembly to hold the actuator in the open position, and the space between the third piston and the closed end of the bore forms an hydraulic accumulator to which fluid is admitted from the high pressure source through an axial inlet port in the third piston. Thus the inner end of the bore of the expander piston is at all times subjected to hydraulic pressure and the actuator is urged into the open position by this pressure and the spring loading, which acts primarily as a stop.

The or each solenoid operated control valve incorporates a valve member which is normally held against a seating in a housing by a pre-loaded spring to prevent high pressure from the accumulator or high pressure circuit from escaping therefrom. When the solenoid is energized by an appropriate D.C. signal from an electronic module, the pre-loaded spring loading is overcome to allow the valve member to be moved away from the seating by the fluid under pressure. During this movement the valve member closes an outlet from the valve to a reservoir supplying the high pressure source and fluid under pressure is admitted to a space in the stepped bore between the actuator piston and a step in the bore at the change in diameter. Thus fluid at equal pressures is applied to opposite sides of the actuator piston but, due to the difference in the areas of the two sides, a resultant force applied to the piston assembly is sufficient to move the assembly in a direction to increase progressively the effective volume of the chamber.

When the deceleration of the braked wheel is reduced to at least the predetermined value, the solenoid is de-energized and the pre-loaded spring urges the valve member against the seating to disconnect the hydraulic pressure supply from the said space in the stepped bore and return it to the reservoir.

Some embodiments of our invention are illustrated in the accompanying drawings in which:

FIG. 5 is a longitudinal section through an actuator similar to that shown in FIG. 2 but of tandem construction incorporating a pair of expander pistons arranged in parallel and adapted to be actuated by a single actuator piston.

Figure 1:
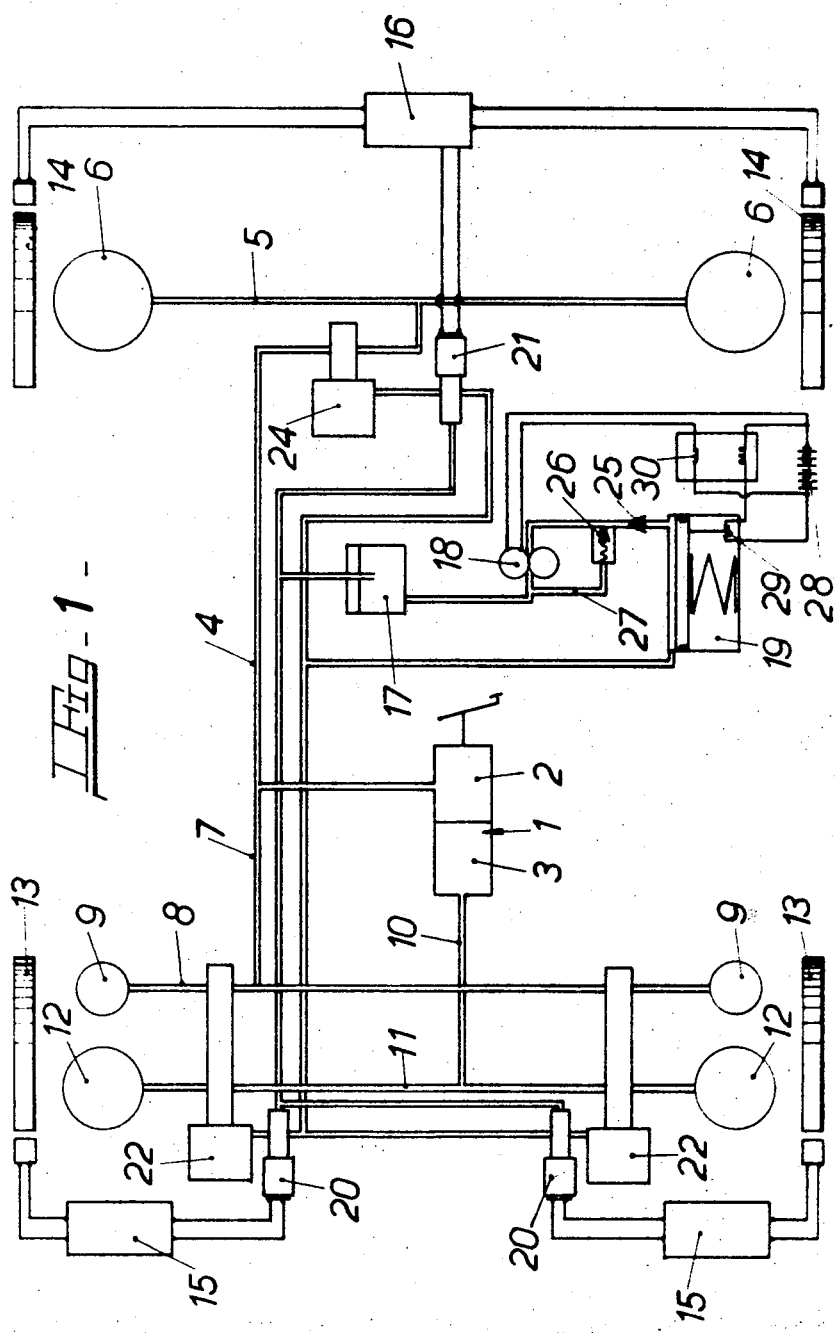
FIG. 1 is a layout of an hydraulic braking system.

In the layout illustrated in FIG. 1, 1 is a pedal-operated tandem master cylinder having two pressure spaces 2 and 3. The pressure space 2 is connected through pipe-lines 4 and 5 to slave cylinders 6 for actuating brakes on the rear wheel of the vehicle, and through pipe-lines 7 and 8 to slave cylinders 9 for actuating brakes on the front wheels of the vehicle. The pressure space 3 is also connected through pipe-lines 10 and 11 to separate slave cylinders 12 for actuating the brakes on the front wheels of the vehicle.

When the brakes are applied the deceleration of each front wheel is sensed by an electrically inductive sensor 13, and the deceleration of each rear wheel is sensed by an electrically inductive sensor 14.

When the deceleration of one or more wheels exceeds a predetermined value the A.C. output from the sensor on that wheel or wheels in question is fed to electronic control means which convert the A.C. signal into a D.C. output. Specifically the output from each sensor 13 is fed to a separate electronic control module 15, and the A.C. signals from the sensors 14 are fed to a common electronic control module 16.

The system includes a supply circuit of hydraulic fluid under pressure comprising a reservoir 17 for hydraulic fluid feeding an electrically driven pump 18. The pump 18 pumps fluid under pressure to an hydraulic accumulator 19. Fluid under pressure from the hydraulic accumulator 19 is delivered through a first circuit to a pair of control valves 20, and is then returned to the reservoir 17. Simultaneously fluid under pressure from the hydraulic accumulator 19 is delivered through a second circuit to a third control valve 21 and is then returned to the reservoir 17.

Each control valve 20 is adapted to regulate the supply of fluid from the first circuit to an actuator 22 for controlling the braking effort applied to one of the front wheels of the vehicle in response to the D.C. output signal received from the control module 15 to which it is connected. The output signals from each control module 15 are responsive to the deceleration of the front wheel with which that module 15 is associated.

The control valve 21 is adapted to regulate the supply of fluid from the second circuit to an actuator 24 for controlling the braking effort applied to the rear wheels of the vehicle in response to the D.C. output signal received from the control module 16. The output signals from the control module 16 is responsive to the deceleration of the rear wheels of the vehicle.

A non-return valve 25 is located in the output side of the pump 18 to ensure that leak-back of pressure cannot occur in the system, which is maintained at substantially 300 p.s.i. by the pump. A relief valve 26 is fitted in the line between the pump 18 and the non-return valve 25 to protect the system from over-pressurization, any overspill being returned to the reservoir through a by-pass line 17.

The pump 18 is driven from the battery 28 of the vehicle, and the accumulator 19 incorporates a pressure switch 29 of which the contacts are held open when the system is fully pressurized. When the pressure of the system falls, the contacts of the switch 29 close and energize a relay 30 to start up the pump 8 until the system attains a normal working pressure when it is switched off by the contacts of the pressure switch 29 which open automatically again in response to the pressure attained in the hydraulic accumulator 19.

Figure 2:
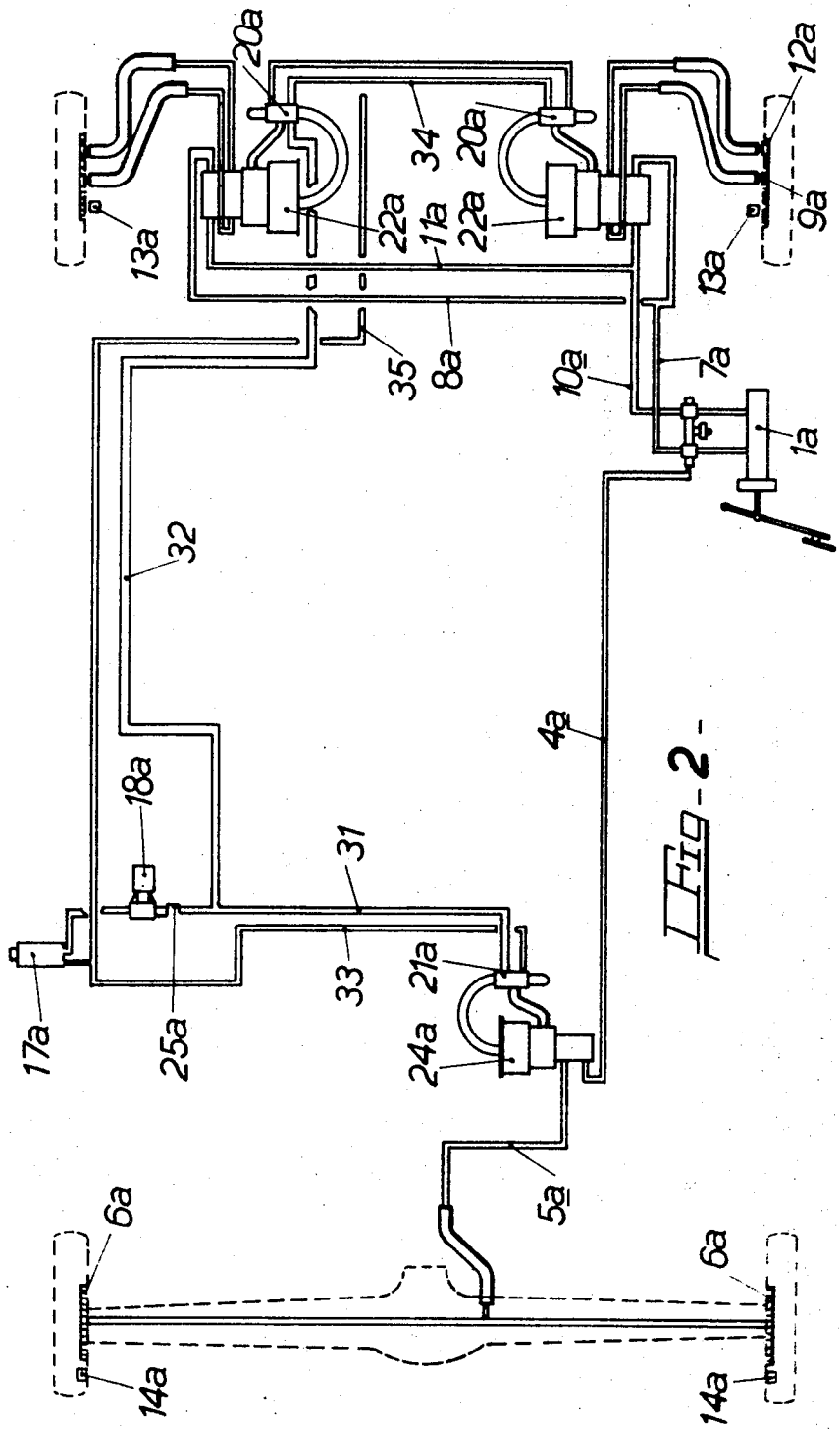
FIG. 2 is a layout of a braking system similar to the system illustrated in FIG. 1 but showing some modifications.

The braking system shown in the layout of FIG. 2 is similar to that illustrated in FIG. 1 and corresponding reference numerals qualified by the suffix *a* have been used to indicate corresponding parts.

In this embodiment the hydraulic accumulator 19 has been omitted and the electrically driven pump 18*a* is supplied directly with fluid from the reservoir 17*a*. The electrically driven pump 18*a* is provided with two outlet lines 31 and 32. The line 31 delivers fluid under pressure to the control valve 21*a* and, when the control valve 21*a* is open, fluid is returned from the control valve 21*a* to the reservoir 17*a* through a return line 33. Similarly the pump 18*a* delivers fluid under pressure through the pipe-line 31 to the control valves 20*a* which are connected in series by a pipe-line 34. When the control valves 20*a* are open, fluid is returned from the control valves 20*a* to the reservoir 17*a* through a return line 35.

Normally the control valves 20*a* and 21*a* are closed so that hydraulic fluid under pressure is trapped in the lines 32 and 31 respectively on the downstream side of the non-return valve 18*a* between the valve 18*a* and the control valves.

Figure 3:
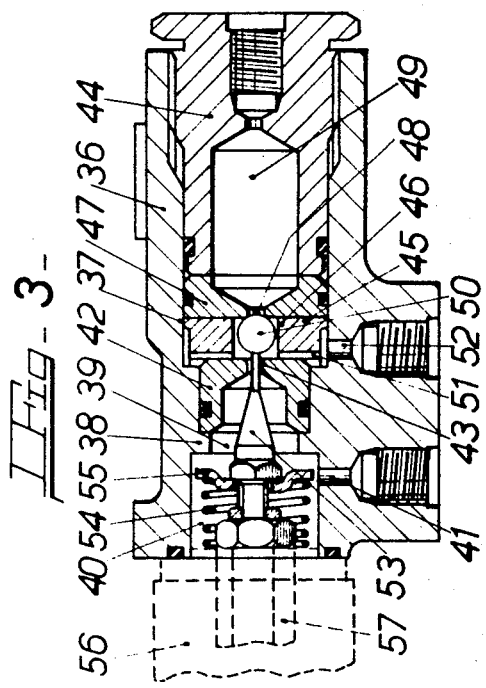
FIG. 3 is a longitudinal section through a control valve for use in the braking system of FIG. 1 or FIG. 2.

Each control valve 20, 20*a* and 21*a* is of the construction illustrated in FIG. 3 of the drawings. As illustrated 36 is a housing having a stepped cylindrical throughbore 37 of which portions of the bore are separated by a partition member 38 having a central opening 39. A chamber 40 between one face of the partition member 38 and one end of the housing is formed with a radial port 41 connected to the return line to the reservoir 17, 17*a*. The opposite face of the partition member 38 forms an abutment for the inner end of a cup-shaped sleeve 42 which is formed in its closed end with a central opening 43. The sleeve 42 is held in engagement with the partition member 38 by a plug 44 screwed into the opposite end of the bore 27 in a portion of enlarged diameter. A spacer member 45 having a central opening 46 of substantial diameter is clamped between the sleeve 42 and an adjacent face of an annular member 47 of which the opposite face is in abutment with the inner end of the plug 44.

The annular member 47 is provided with a central opening 48 of a diameter substantially equal to that of the opening 43 and is in communication with an axial passage 49 in the pump circuits.

A valve member in the form of a ball 50 is located in a chamber between the sleeve 42 and the annular member 47 and is defined by the opening 46. The ball 50 is adapted to engage with one of a pair of axially spaced seatings surrounding the openings 43 and 48 to prevent flow through that opening. The chamber 46 is connected by the actuator 22, 22a or 24, 24a through a radial passage 51 in the member 45 and a communicating radial port 52 in the cylinder wall.

Normally the ball 50 is held against the seating surrounding the opening 48 to cut-off communication between the high pressure circuit and the actuator 22,22a or 24, 24a by a push-rod assembly 53 located in the chamber 40 and extending through the opening 43 at its inner end. The push-rod assembly 53 is urged in this direction by a pre-loaded spring 54 acting between an abutment plate 55 and the inner end of the casing 56 of a solenoid assembly 57 adapted to be energized by D.C. supply from one of the electronic control modules 15 or 16.

When the deceleration of one of the braked wheels exceeds a predetermined value, the solenoid 57 of the control valve 22, 22a or 24, 24a is energized by the D.C. supply from the module 15 or 16 associated with that wheel and the push-rod assembly 53 is withdrawn against the force in the pre-loaded spring 54. The high pressure fluid in the circuit acts on the ball 50 and urges it into engagement with the seating surrounding the opening 43 to cut-off communication with the reservoir 17, 17a through the port 41. Simultaneously fluid under pressure passes to the corresponding actuator 22, 22a or 24, 24a which operates in a manner to be described.

When the deceleration of the wheel is reduced to a value at least equal to the predetermined value, the solenoid 57 is de-energized and the pre-loaded spring 54 acts on the push-rod assembly 53 to urge the ball 50 into engagement with the seating surrounding the opening 48. The high pressure fluid previously supplied to the actuator 22,22a or 24, 24a returns to the reservoir 17, 17a through the opening 43, the chamber 40 and the port 41.

Figure 4:
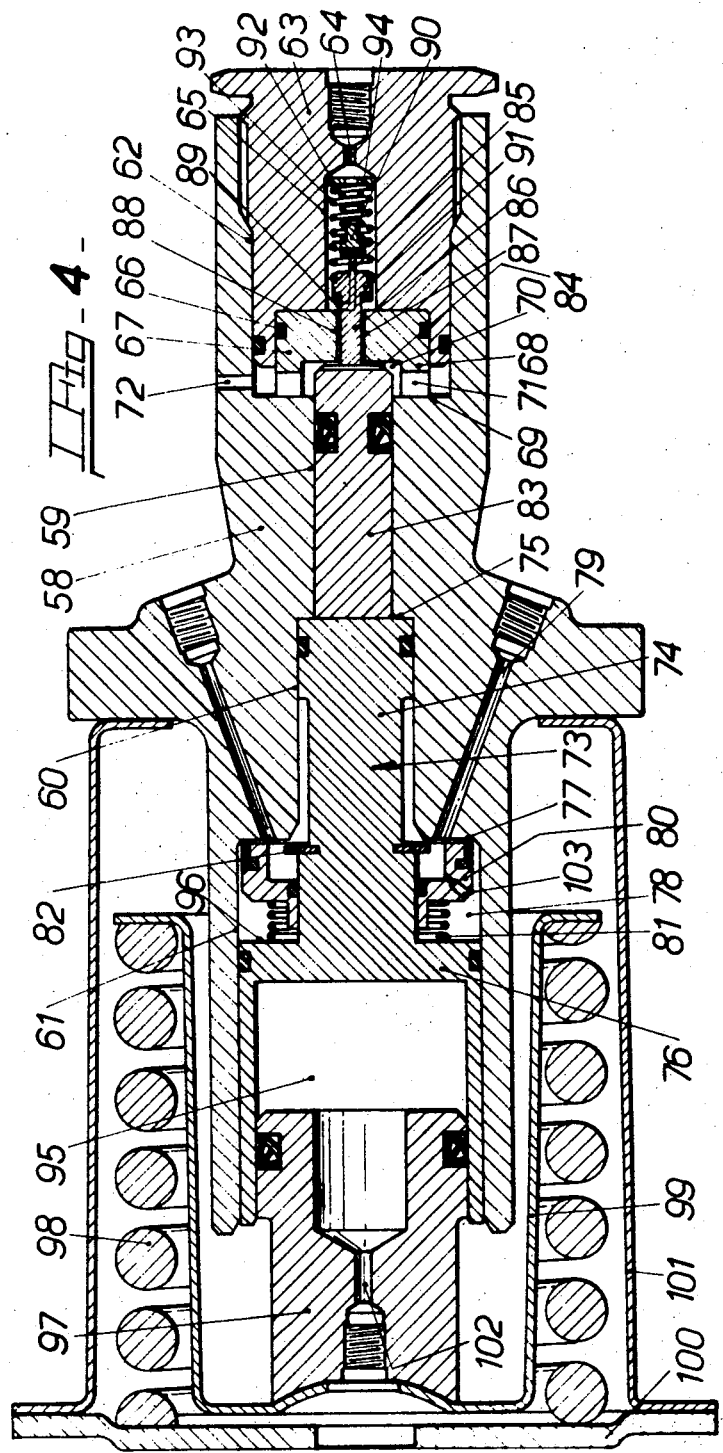
FIG. 4 is a longitudinal section through an actuator for use in the braking system of FIG. 1 or FIG. 2.

The actuator 24, 24a which is controlled by the control valve 21, 21a is illustrated in FIG. 4 of the accompanying drawings. The actuator 24 comprises a body 58 in which is formed a through bore having three stepped portions 59, 60 and 61 of constant progressively increased diameter. The smallest diameter portion 59 of the bore leads into bore portion 62 of substantial diameter terminating at one end of the body 58. A plug 63 having an axial inlet passage 64 for connection in the pipe-line 4,4a leading to the rear wheel brakes is screwed in the outer end of the bore portion 62. The inlet passage 64 at its inner end leads into a bore 65 which is counterbored at 66 at its opposite end to receive a recessed annular member 67. The member 67 includes a forwardly extending annular flange 68 which abuts against a shoulder 69 at the step in diameter between the bore portions 59 and 62 and projects inwardly beyond the inner end of the plug 63. A chamber 70 defined between the shoulder 69 and adjacent face of the member 67 and the plug 63 is connected to the slave cylinders 6, 6a of the rear wheel brakes through radial openings 71 in the flange 68, and a port 72 in the cylinder wall.

A stepped piston assembly works in the stepped bore and comprises a differential actuator piston 73 working in the portions 60 and 61 of the bore. The piston is arranged such that when the outer end of the portion 74 of lesser diameter is in abutment with a step 75 at the change in diameter between the bore portions 60 and 59, the portion 76 of greater diameter is spaced from a step 77 at the change in diameter between the portions 61 and 60 to define a chamber 78 connected through an inclined drilling 79 to the port 52 of the control valve 21, 21a. A cup-shaped piston 80 located within the chamber 98 is slidably mounted on the piston portion 74 and is normally urged into engagement with the step 77 by a spring 81. The travel of the piston 80 relative to the portion 74 is limited by the engagement with the piston 80 of a stop ring 82 carried by the stepped piston portion 74.

An expander piston 83 works in the portion 59 of the bore and is of such a length as to project into the chamber 70 when the portion 74 of the stepped piston assembly is in engagement with the step 75. The end 84 of the expander piston 83 remote from the portion 74 is in abutment with the inner end of a pair of concentric valve stems 85 and 86 which project into the bore 65 in the plug 63 through a central opening 87 in the member 67. A clearance 88 is provided between the outer stem 86 and the opening 87 and a bleed hole 89 also connects the chamber 65 to a clearance 88 between the stem 85 and 86, so that fluid from the master cylinder 1,1a can pass to the slave cylinders 6 of the rear wheel brakes when the brakes are applied normally. The inner stem 65 is longer than the outer stem 86, and each stem carries a valve head 90 and 91 respectively at its outer end. The inner ends of the valve stems 85 and 86 are normally urged into engagement with the outer end of the expander piston 83 by concentric compression springs 92 and 93 in abutment with a centrally apertured plate 94 in engagement with the end of the bore 65 remote from the expander piston 83.

The larger diameter portion 76 of the actuator piston 73 is formed in its outer end with an axially extending recess or blind bore of an area less than the area 96 of the step in diameter between the portions 76 and 74 of the piston 73. A piston 97 works the bore 95 and is urged towards the base of the recess by a spring 98 which acts as a stop. The spring 98 is located between the inner end of a cage 99 surrounding the portion of the body containing at least a part of the portion 61 of the bore and engaging with the piston 97. An abutment plate 100 is secured to the body 58 and is held in a fixedly spaced relationship thereto by an axially extending cage or shroud 101.

The piston 97 has an axial passage 102 leading into the recess 95 to which fluid under pressure is supplied from the hydraulic accumulator 19 or the pump 18a for applying to the piston a force in opposition to and greater than the force in the spring 98. The valves 90 and 91 are normally held in open positions when the brake is applied by a force acting on the pistons 73 and 88 which is greater than the force in the springs 92 and 93 plus the force exerted on the expander piston 83 by the fluid pressure from the master cylinder 1,1a.

For normal operation of the system fluid under pressure is supplied from the master cylinder 1, 1a to the slave cylinders 6, 6a, 9 9a and 12, 12a of the wheel brakes to apply the brakes.

When the deceleration of one of the rear wheels exceeds a predetermined value the solenoid 57 of the control valve 21, 21a is energized as described above to deliver fluid under pressure from the accumulator 19 or pump 17a to the chamber 78 in the bore portion 61. The pressure acts on the area 96 between the piston portions 74 and 76 to move the actuator piston 73 rearwardly away from the step 75. Due to the loading in the springs 92 and 93 and the master cylinder pressure in the chamber 65 the expander piston 83 follows this movement to increase progressively the effective volume of the chamber 70 and permit the valve head 91 to cut off flow through the clearance 88 and subsequently permit the valve head 90 to seat on the head 91 and cut-off flow through a clearance between the concentric valve stems 85 and 86. Thus the supply of braking fluid from the master cylinder 1,1a to the slave cylinders of the rear wheel brakes is cut-off. Thereafter further rearward movement of the actuator piston 73 and the expander piston 83 serve to increase still further the effective volume of the chamber 70 to relieve the pressure applied to the rear wheel brakes thus decreasing the rate of deceleration of the wheels. During this movement the piston 80 is initially held in engagement with the step 77 by the force in the spring 81 until the piston 80 is carried rearwardly by the piston 73 due to the engagement with the piston 80 of the stop ring 82.

When the deceleration of the wheel is reduced to the predetermined value and the solenoid 66 is de-energized to close the control valve 21, 21a the supply of fluid from the accumulator 19 or pump 17a to the chamber 78 is cut-off and the chamber 78 is placed in communication through the control valve 21, 21a with the reservoir 17,17a. Initially, fluid is returned rapidly to the reservoir 17, 17a until the piston 80 again engages with and seats against the step 77. Thereafter the return of fluid is less rapid as it is accomplished by a bleed through an orifice 103 in the piston 80. Thus there is a delay until a point is reached in which the valves 90 and 91 open sequentially to permit re-application of the brakes in the normal manner and at the original pressure as described above. However, before the point of re-application referred to above is reached, in any case the brakes are re-applied progressively at an intermediate pressure less than that of the master cylinder 1,1a due to the progressive insertion of the outer end of the expander piston 83 into the chamber 70 to reduce the effective volume of the chamber and pressurize the trapped volume of fluid contained therein.

The delay in relieving the pressure in the chamber 78 due to the provision of the orifice 103 has the advantage that a sufficient interval of time is available for the sensors 14 to sense what is occuring during the progressive re-application of the brakes by the movement of the expander piston 83 into the chamber 70. Specifically movement of the actuator piston in a direction to permit the valves 90 and 91 to close is faster than in the opposite direction to open the valve. This characteristic is shown in FIG. 6 which is a graph of brake line pressure plotted against time.

Figure 6:
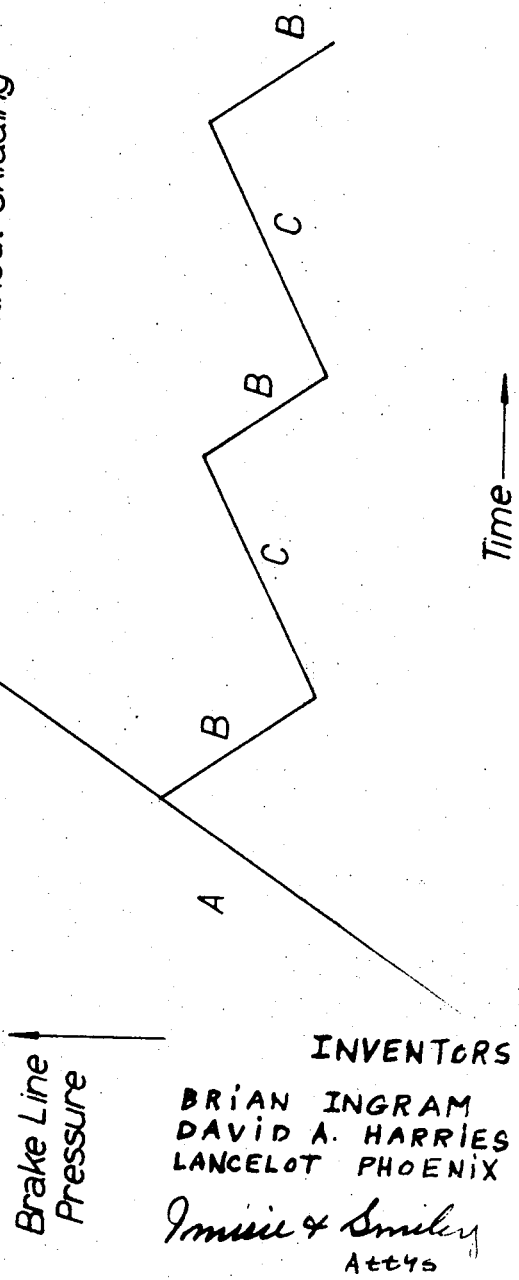
FIG. 6 is a graph of brake line pressure against time.

In the graph illustrated in FIG. 6:
the rate of pressure rise A is controlled by an orifice in the line between the master cylinder 1,1a and the slave cylinders 6,6a, 9,9a 12,12a;
the rate of pressure drop B is controlled by the opening 43 in the sleeve 42 in the control valve 20,20a 21,21a which acts as an orifice; and
the rate of pressure rise C is controlled by a plate orifice in the line between the actuator 22, 22a and the slave cylinders 9,9a and 12,12a and 6, 6a respectively.

Reciprocation of the expander piston 83 may occur a number of times to affect re-application of the brakes in response to wheel acceleration or deceleration before the valves 90 and 91 are re-opened. Such reciprocation of the expander piston 83 is controlled by movements of the actuator piston 73 which in turn are dictated by operation of the control valve 21, 21a regulating the supply of fluid under pressure to the chamber 78 as described above. Re-opening of the valves 90 and 91 occurs only when the braked wheel contacts a surface of a co-efficient of friction higher than the surface with which that wheel was previously in contact and capable of accepting a braking force corresponding to the fluid pressure trapped in the line between the actuator 24, 24a and the slave cylinder 6, 6a in accordance with the position of the expander piston 83. Alternatively, re-opening of the valves 90 and 91 occurs when the pedal pressure applied to the master cylinder 1,1a is reduced by a sufficient amount.

The actuator described above with reference to FIG. 4 is suitable for use when only the pressure in a single line to a wheel brake or brakes is/are to be regulated.

Where the brakes on wheels of a vehicle are cross-connected, that is to say when separate slave cylinders of the same brakes are supplied with fluid from different pressure spaces of a master cylinder, as for example the front wheel brakes of the layout illustrated in FIG. 1 and 2 of the drawings, it is necessary for the pressure in each supply line to the slave cylinders of the same brake to be regulated simultaneously.

This can be achieved by combining together two actuators of the kind described above with reference to FIG. 4 into a single in-line assembly. In such a construction a pair of expander pistons 83, together with valves which are equivalent to valves 90 and 91 are arranged in end-to-end relationship so that each expander piston controls the volume of one line of a tandem brake system and both expander pistons are actuated simultaneously by one actuator piston 73.

It is however preferred that a pair of expander pistons 83 are arranged in separate bores in the body of the actuator and are operated simultaneously by a single actuator piston assembly. Such a tandem actuator assembly is illustrated in FIG. 5 of the drawings and corresponding reference numerals qualified by the suffix *b* have been used to indicate the parts which correspond to and are identical with those in the actuator described above with referece to FIG. 4.

It will be seen from FIG. 5 of the drawings that two expander pistons 83b are provided and each piston regulates the effective volume of a chamber 70b at the outer end of bore portion 59b in which that piston works. The plugs 63b are each connected in the pipelines 11 11a and 8, 8a to the separate slave cylinders 12, 12a 9, 9a of the brakes on one front wheel of the vehicle, and the passages 72b leading from the chambers 70b are connected in corresponding pipe-lines on the downstream slave cylinder side.

An actuator as illustrated in FIG. 5 is provided for each of the front wheels of the vehicle and each actuator is controlled by a separate control valve 20, 20a responsive to the deceleration sensed by the sensor 13, 13a of the wheel supplying a signal to the control module 15 of that control valve.

When the brakes are applied by operation of the master cylinder 1, 1a, the slave cylinders 12, 12a and 9 9a are operated by the supply of fluid under pressure through the inlet ports 64b, the chambers 71b and the outlet passages 72b.

When the deceleration of one of the front wheels exceeds a predetermined value, the control valve responsive to deceleration of that wheel supplies high pressure fluid to the chamber 78b as described above with reference to FIG. 4 and the subsequent sequence of operation is as described above except that both expander pistons 83b are operated simultaneously to regulate the supply of fluid pressure through the pipelines, 8,8a and 11, 11a simultaneously.

The advantage of the construction illustrated in FIG. 5 is that only half the stroke is required as compared with that of in-line assembly. Furthermore normal braking performance is available in the event of failure of one of the expander pistons 83b or its associated braking system. That is to say the total force applied by the actuator piston 73b is then applied to one expander piston area resulting in twice the output pressure being applied to its associated braking circuit.

In the embodiments described above the single actuator 24, 24a and each tandem actuator 22, 22a may each be embodied into a single unit with the control valve 21, 21a or 20, 20a by which it is controlled.

In the braking systems described above with reference to FIGS. 1 and 2 the brakes on the front wheels of the vehicle are applied from separate pairs of slave cylinders 9,9a and 12, 12a. Preferably, each pair of slave cylinders actuates a single disc brake. When the slave cylinders of each pair are of equal diameters and cross-section the expander pistons 83b are of equal cross-section. However, when the slave cylinder of each pair are of different diameters, the cross-section areas of the expander pistons 83b are different to compensate for the difference in cross-section area between the slave cylinders.

The braking systems illustrated in the layouts of FIGS. 1 and 2 have the advantage that energy is stored during normal running of the vehicle and the energy so stored is used to effect rapid closure of the valves 90 90b and 91, 91b, and rapid relief of fluid pressure applied to the slave cylinders 6, 6a 9,9a and 12, 12a.

In the layouts illustrated in FIGS. 1 and 2 we have embodied a pedal-operated tandem master cylinder 1, 1a It is to be understood that this may be replaced by a pedal operated booster assisted tandem master cylinder or by a pedal-operated hydraulic power assisted tandem power-assisted tandem master cylinder for example of the kind forming the subject matter of our co-pending patent application Ser. Nos. 28296/68, 28299/68, 16888/69 and 16377/69.

Similarly the layouts illustrated in FIGS. 1 and 2 may be modified so that any combination of slave cylinders of the wheel brakes may be operated from one or both pressure spaces of the master cylinder 1a. In any such modified arrangement the control valve and single or tandem master cylinders as appropriate will be provided in the line or lines through which fluid under pressure is supplied to the slave cylinders.

The layouts illustrated in FIGS. 1 and 2 may be modified further to provide means for automatically maintaining the body of the vehicle at a constant height above the ground irrespective of the loading on the vehicle, and for regulating the braking effort applied to at least the rear wheels of the vehicle in accordance with the loading on the vehicle by suitable use of the available fluid from the high pressure source.

We claim:

1. An hydraulic braking system for a vehicle comprising a supply of hydraulic fluid, a wheel brake, a master cylinder for controlling the pressure of hydraulic fluid applied to said wheel brake from said supply, an actuator interposed between said master cylinder and said wheel brake, means in said actuator defining a chamber having an inlet connected to said master cylinder and an outlet connected to said wheel brake, a piston assembly working in a bore in said actuator communicating with said chamber and movable between a first advanced position in which the effective volume of said chamber is at a minimum value and a second retracted position in which the effective volume of said chamber is greater than said minimum value, a movable wall in said actuator and acting on said piston assembly, pressure means for normally subjecting one side of said movable wall to a supply of pressure fluid to urge said piston assembly into said first position, sensing means for providing a control signal when the deceleration of the braked wheel exceeds a predetermined value, and a control valve responsive to said control signal to connect said pressure fluid to the opposite side of the movable wall to equalize the pressure on each side of the movable wall and to cause movement of said piston assembly to said second position whereby the pressure of said hydraulic fluid in a line between said chamber and said wheel brake is reduced.

2. An hydraulic braking system as claimed in claim 22 incorporating means for restoring said control valve to an inoperative position at the termination of said control signal cutting of said supply of pressure fluid to the opposite side of the movable wall whereby said piston assembly is again urged by said supply of pressure fluid on said one side of the movable wall into said first advanced position to progressively reduce said effective volume of said chamber to said minimum value and effect re-application of said wheel brake.

3. An hydraulic braking system as claimed in claim 1, wherein said movable wall comprises a piston working in an hydraulic cylinder and subjected over different areas to hydraulic fluid pressures controlled by said control valve.

4. An hydraulic braking system as claimed in claim 1 wherein the movable wall comprises a diaphragm assembly.

5. An hydraulic braking system as claimed in claim 1, including a spring acting on said pressure fluid urging said movable wall and said piston assembly towards said first advanced position in which said effective volume of said chamber is at said minimum value whereby, in the event of the failure of said pressure fluid, movement of said piston assembly towards said second retracted position is in opposition to the force in said spring.

6. An hydraulic braking system as claimed in claim 1, wherein valve means under the control of said piston assembly are adapted to control the flow of fluid from said master cylinder to said wheel brake through said chamber.

7. An hydraulic braking system as claimed in claim 6, wherein said valve means comprises a two stage valve whereby brake application and release is effected gradually.

8. An hydraulic braking system as claimed in claim 22, including an electrically inductive sensor fitted to said wheel and an electronic control module to receive an A.C. output signal from said sensor and to convert said A.C. signal into a D.C. output, and a solenoid energized by said D.C. output for actuating said control valve.

9. An hydraulic braking system as claimed in claim 8 wherein each wheel of the vehicle is provided with an electrically inductive sensor, a separate electronic control module for each wheel to receive an A.C. output signal from said sensor and to convert said A.C. signal into a D.C. output, a solenoid energized by said D.C. output to actuate said control valve for controlling delivery to and exhaust from said actuator which regulates said effective volume of said chamber.

10. An hydraulic braking system as claimed in claim 8, wherein the A.C. output signals from a pair of wheel sensors are fed into a common electronic control module which differentiates the signals and feeds a D.C. output to the solenoid operated valve controlling the braking of that pair of wheels.

11. An hydraulic braking system as claimed in claim 1 wherein said piston assembly comprises an expander piston for regulating said effective volume of said chamber, and an actuator piston of greater diameter for controlling movement of the expander piston.

12. An hydraulic braking system as claimed in claim 1, wherein said piston assembly comprises two expander pistons in parallel relationship, and a single actuator piston of large diameter for controlling movement of both expander pistons.

13. An hydraulic braking system as claimed in claim 12, wherein said expander pistons are equal in diameter.

14. An hydraulic braking system as claimed in claim 12, wherein said expander pistons are of different diameters.

15. An hydraulic braking system as claimed in claim 1 wherein said piston assembly comprises at least one expander piston for controlling said effective volume of said chamber, a single actuator piston for controlling movement of said expander piston, said actuator piston at an end remote from said expander piston being provided with a recessed bore, and a third piston working in said bore in said actuator piston, and wherein the space between said third piston and said recessed bore forms an hydraulic accumulator to which said pressure fluid is normally admitted through an axial inlet port in said third piston to hold said expander piston in an advanced position in which said effective volume of said chamber is at said minimum value, and valve means for controlling communication between said chamber and said wheel brakes are held in an open position when said expander piston is in said advanced position.

16. An hydraulic braking system as claimed in claim 15 including a spring acting on said third piston to urge said third piston towards said actuator piston at all times.

17. An hydraulic braking system as claimed in claim 1 wherein said control valve comprises a solenoid operated control valve incorporating a valve member, a seating, and a pre-loaded spring normally holding said valve member against said seating to prevent high pressure fluid escaping therefrom, an electronic module for producing a D.C. signal responsive to deceleration of said braked wheel for energizing said solenoid whereafter said valve member is moved away from said seating by the pressure of said fluid against the force in said pre-loaded spring.

18. An hydraulic braking system as claimed in claim 17 wherein movement of said valve member away from said seating closes an outlet to a reservoir supplying a source for said pressure fluid and said pressure fluid is admitted to a space in said bore in which works said piston assembly whereby said piston assembly is moved in a direction to increase progressively said effective volume of said chamber.

19. An hydraulic braking system as claimed in claim 18, where said piston assembly and said movable wall include a differential piston working in a stepped bore, and said space in said bore is located between a portion of said differential piston of greater diameter and a step in said stepped bore at the change in diameter, and said pressure fluid is normally supplied to an end of said larger diameter portion over an area less than an area of said piston at the change in diameter to urge said piston assembly into said first advanced position, whereby said fluid admitted to said space at an equal pressure causes a resultant force to be applied to said piston assembly to increase said effective volume of said chamber.

20. An hydraulic braking system as claimed in claim 18, wherein when the deceleration of said braked wheel is reduced to at least said predetermined value, said solenoid is de-energized and said pre-loaded spring urges the valve member against said seating to disconnect the hydraulic pressure supply from said space in said bore and return it to said reservoir.

* * * * *